(12) United States Patent
Meixner

(10) Patent No.: US 10,823,266 B2
(45) Date of Patent: *Nov. 3, 2020

(54) TRANSMISSION DEVICE FOR A MOTOR VEHICLE

(71) Applicant: AUDI AG, Ingolstadt (DE)

(72) Inventor: Christian Meixner, Ingolstadt (DE)

(73) Assignee: AUDI AG, Ingolstadt (DE)

(*) Notice: Subject to any disclaimer, the term of this patent is extended or adjusted under 35 U.S.C. 154(b) by 171 days.

This patent is subject to a terminal disclaimer.

(21) Appl. No.: 15/307,667

(22) PCT Filed: Apr. 14, 2015

(86) PCT No.: PCT/EP2015/000785
§ 371 (c)(1),
(2) Date: Oct. 28, 2016

(87) PCT Pub. No.: WO2015/165570
PCT Pub. Date: Nov. 5, 2015

(65) Prior Publication Data
US 2017/0051816 A1    Feb. 23, 2017

(30) Foreign Application Priority Data

Apr. 30, 2014   (DE) .................. 10 2014 006 232

(51) Int. Cl.
*F16H 37/08*      (2006.01)
*B60K 17/344*    (2006.01)
(Continued)

(52) U.S. Cl.
CPC .......... *F16H 37/082* (2013.01); *B60K 17/08* (2013.01); *B60K 17/16* (2013.01); *B60K 17/165* (2013.01);
(Continued)

(58) Field of Classification Search
CPC .......... F16H 37/082; F16H 3/66; F16H 48/10; F16H 48/05; F16H 37/0813; F16H 48/11;
(Continued)

(56) References Cited

U.S. PATENT DOCUMENTS 3,343,620 A * 9/1967 Karavias ................ B60K 17/34
                                                                 180/211
5,127,887 A * 7/1992 Nuttall ................... B60K 17/34
                                                                 475/2

(Continued)

FOREIGN PATENT DOCUMENTS

CA         2742219 A1    1/2012
DE  10 2006 038 358 A1   2/2008
(Continued)

OTHER PUBLICATIONS

International Search Report issued by the European Patent Office in International Application PCT/EP2015/000785.
(Continued)

*Primary Examiner* — Jeffrey A Shapiro
(74) *Attorney, Agent, or Firm* — Henry M. Feierelsen LLC

(57) ABSTRACT

A transmission device for a motor vehicle includes a first connecting shaft operatively connectable to a first subaxle of a wheel axle of the motor vehicle; a second connecting shaft operatively connectable to a second subaxle of the wheel axle; a coupling transmission having a drive shaft operatively connectable with a drive aggregate of the motor vehicle, and an output shaft operatively connectable with the first wheel axle, wherein via the coupling transmission the drive shaft is operatively connected with the output shaft and with the first and the second connecting shaft for torque distribution; and a superposition transmission, wherein the output shaft is operatively connectable with at least one of the first connecting shaft and the second connecting shaft via
(Continued)

the superposition transmission by shifting the superposition transmission.

12 Claims, 7 Drawing Sheets

(51) Int. Cl.
| | |
|---|---|
| *B60K 23/08* | (2006.01) |
| *B60K 17/16* | (2006.01) |
| *F16H 48/08* | (2006.01) |
| *B60K 17/08* | (2006.01) |
| *F16H 3/66* | (2006.01) |
| *F16H 48/10* | (2012.01) |
| *B60K 23/04* | (2006.01) |

(52) U.S. Cl.
CPC ............ *B60K 17/344* (2013.01); *B60K 23/08* (2013.01); *B60K 23/0808* (2013.01); *F16H 3/66* (2013.01); *F16H 37/0813* (2013.01); *F16H 48/08* (2013.01); *F16H 48/10* (2013.01); *B60K 2023/043* (2013.01); *B60Y 2400/82* (2013.01)

(58) Field of Classification Search
CPC ........... F16H 48/22; F16H 2057/02052; B60K 17/344; B60K 23/0808; B60K 17/08; B60K 17/16; B60K 17/165; B60K 17/3462; B60K 17/3467; B60K 17/35; B60K 17/352; B60K 17/354; B60K 23/08; B60K 2023/043; B60Y 2400/82
See application file for complete search history.

(56) References Cited

U.S. PATENT DOCUMENTS

| | | | | |
|---|---|---|---|---|
| 5,282,518 | A * | 2/1994 | Yamasaki ............ | B60K 17/35 180/233 |
| 5,492,189 | A * | 2/1996 | Kriegler .................. | B60K 6/12 180/65.23 |
| 5,947,858 | A * | 9/1999 | Williams ........... | B60K 17/3467 180/247 |
| 6,251,037 | B1 * | 6/2001 | Baumgaertner ......... | B60K 6/26 180/65.235 |
| 6,523,633 | B1 * | 2/2003 | Teraoka ................. | B60K 17/04 180/248 |
| 6,645,109 | B2 * | 11/2003 | Williams ........... | B60K 17/3465 180/248 |
| 6,726,591 | B2 * | 4/2004 | Maruyama ........... | B60K 17/346 180/248 |
| 7,311,633 | B2 * | 12/2007 | Maruyama ......... | B60K 17/3462 475/221 |
| 7,527,133 | B2 * | 5/2009 | Sachsenmaier ....... | F16D 27/115 180/249 |
| 7,680,576 | B2 * | 3/2010 | Nagura .............. | B60K 23/0808 180/197 |
| 7,694,598 | B2 * | 4/2010 | Kriebernegg ........... | F16H 61/32 192/48.2 |
| 8,727,927 | B2 | 5/2014 | Meixner | |
| 9,669,710 | B2 * | 6/2017 | Meixner ............ | B60K 17/3462 |
| 9,902,261 | B2 * | 2/2018 | Meixner .............. | B60K 17/346 |
| 2002/0128117 | A1 * | 9/2002 | Schroder ............ | B60K 17/3462 477/72 |
| 2005/0087380 | A1 * | 4/2005 | Brown ............... | B60K 23/0808 180/233 |
| 2006/0135307 | A1 * | 6/2006 | Lim ..................... | B60K 17/344 475/198 |
| 2006/0142119 | A1 * | 6/2006 | Meixner ............ | B60K 17/3462 477/176 |
| 2007/0087889 | A1 * | 4/2007 | Rosemeier .......... | B60K 17/344 475/205 |
| 2008/0035405 | A1 * | 2/2008 | Oberhausen ........... | B60K 17/16 180/245 |
| 2008/0242498 | A1 * | 10/2008 | Miller ................... | B60W 10/30 477/5 |
| 2009/0045026 | A1 * | 2/2009 | Ishii ........................ | F16H 3/006 192/48.614 |
| 2009/0098969 | A1 * | 4/2009 | Tabata .................... | B60L 50/16 475/5 |
| 2010/0218632 | A1 * | 9/2010 | Sasaki .................... | F16D 27/115 74/416 |
| 2010/0263958 | A1 * | 10/2010 | Kochidomari ......... | B60K 17/08 180/366 |
| 2015/0252876 | A1 | 9/2015 | Meixner et al. | |
| 2015/0291026 | A1 * | 10/2015 | Meixner .............. | B60K 17/346 180/375 |
| 2016/0159214 | A1 * | 6/2016 | Meixner ............ | B60K 17/3462 475/223 |

FOREIGN PATENT DOCUMENTS

| | | |
|---|---|---|
| DE | 10 2007 037 676 A1 | 2/2009 |
| DE | 10 2010 012 085 A1 | 12/2011 |
| DE | 10 2012 021 513 A1 | 5/2014 |
| EP | 1 449 704 A2 | 8/2004 |
| EP | 2 402 200 A1 | 1/2012 |

OTHER PUBLICATIONS

Chinese Search Report dated Feb. 5, 2018 with respect to counterpart Chinese patent application 2015800235137.
Translation of Chinese Search Report dated Feb. 5, 2018 with respect to counterpart Chinese patent application 2015800235137.

* cited by examiner ative connectable with the first subaxle, a second connecting shaft operatively connectable with the second subaxle and a coupling transmission with a drive shaft that is operatively connectable with a drive aggregate of the motor vehicle and with an output shaft which is operatively connectable with the first wheel axle is provided, wherein via the coupling transmission the drive shaft is operatively connected with the output shaft and with the first and the second connecting shaft for torque distribution, and wherein the output shaft can be operatively connected with the first connecting shaft and/or the second connecting shaft via a superposition transmission.
TRANSMISSION DEVICE FOR A MOTOR VEHICLE

CROSS-REFERENCES TO RELATED APPLICATIONS

This application is the U.S. National Stage of International Application No. PCT/EP2015/000785, filed Apr. 14, 2015, which designated the United States and has been published as International Publication No. WO 2015/165570 A1 and which claims the priority of German Patent Application, Serial No. 10 2014 006 232.5, filed Apr. 30, 2014, pursuant to 35 U.S.C. 119(a)-(d).

BACKGROUND OF THE INVENTION

The invention relates to a transmission device for a motor vehicle, wherein the motor vehicle has a first wheel axle and a second wheel axle and wherein the second wheel axle consists of at least a first subaxle and a second subaxle.

Such a transmission device serves for example for transmitting a torque between a drive aggregate of the motor vehicle and the at least two wheel axles of the motor vehicle. The first wheel axle and the second wheel axle are connected to the drive aggregate via the transmission device. They are thus driven wheel axles thereby providing the motor vehicle for example with all wheel drive capability. The first wheel axle is for example a front wheel axle of the motor vehicle, while the second wheel axle is the rear axle of the motor vehicle. The inverse arrangement is also possible.

In transmission devices of the aforementioned type a connecting shaft can for example be provided in order to transmit the torque to the second wheel axle, wherein the connecting shaft is in particular configured as a cardanic shaft. In order to achieve good driving characteristics a differential usually has to be assigned to the second wheel axle, which differential is connected to the connecting shaft and ensures a distribution of the torque provided by the transmission device to the first subaxle and the second subaxle. The differential is thus provided in the operative connection between the connecting shaft and the second wheel axle. However, the differential requires a significant amount of space.

SUMMARY OF THE INVENTION

It is an object of the invention the provide a transmission device which has advantages compared to known transmission devices and in particular enables a more compact configuration of the second wheel axle, wherein preferably no differential is present between the connecting shaft and the second wheel axle.

According to the invention this is achieved with the transmission device with the features of the independent patent claim. Hereby a first connecting shaft that is oper- In contrast to the conventional approach in which a torque is transmitted from the transmission device in the direction of the second wheel axle by only one connecting shaft or cardanic shaft, such torque transmission in the present case is accomplished with at least two connecting shafts i.e., the first and the second connecting shaft. The first connecting shaft is or can be coupled with the second wheel axle. The second connecting shaft on the other hand is or can be coupled with the second connecting shaft. Due to the fact that the torque transmission to the two subaxles is performed separate from each other via the two connecting shafts an otherwise required axle differential, which would be assigned to the second wheel axle, can be integrated in the coupling transmission. The coupling transmission is insofar configured as a dual differential which integrates a middle differential and also the axle differential in one constructive unit. This enables a space saving arrangement in the region of the second wheel axel.

The invention of course also relates to a motor vehicle with a transmission device which is preferably configured according to the aforementioned manner. The motor vehicle has the first wheel axle and the second wheel axle, wherein the second wheel axle consists at least of the first subaxle and the second subaxle. The motor vehicle is characterized by a first connecting shaft that is operatively connected with the first subaxle, by a second connecting shaft that is operatively connected with the second subaxle and by a coupling transmission with a drive shaft that is operatively connected the first wheel axle, and with an output shaft that is operatively connected with the first wheel axle, wherein via the coupling transmission the drive shaft is operatively connected with the output shaft and with the first and second connecting shaft for torque distribution and wherein the output shaft is shiftably operatively connectable with the first connecting shaft and/or the second connecting shaft via a superposition transmission. The motor vehicle or the transmission device of the motor vehicle can be modified according to the present description.

The operative connection via the coupling transmission provides for torque distribution. This means that a part of the torque provided via the drive shaft is provided at the output shaft and another part, for example of the same magnitude as the first part, is provided at the second connecting shaft. Hereby in particular an uneven torque distribution between the first wheel axle and the second wheel axle can be achieved, for example at the ratio 40:60. Hereby as explained above the torque provided to the second subaxle is distributed, for example evenly, to the first subaxle and the second subaxle. The first connecting shaft and the second connecting shaft is preferably configured as a cardanic shaft.

The transmission device preferably further includes the superposition transmission, which however is optional. The transmission device can thus also be realized without the superposition transmission. The superposition transmission serves for providing an operative connection with the first connecting shaft, the second connecting shaft or both connecting shafts. The operative connection is hereby preferably switchable. In particular it can be provided that the first connecting shaft as well as the second connecting shaft can be operatively connected with the output shaft via the superposition transmission, wherein however different switching states can be present. In a first switching state for example none of the connecting shafts is operatively connected with the output shaft, in a second switching state only the first connecting shaft and in a third switching state only the second connecting shaft. The superposition transmission has hereby a defined transmission ratio which is for example fixed. Of course the superposition transmission can alternatively also be configured as a manual transmission and can insofar have an adjustable transmission ratio.

It is noted that the superposition transmission is different from the coupling transmission. The operative connection generated via the superposition transmission between the output shaft and the first connecting shaft or the second connecting shaft is insofar not, or at least not entirely, realized via the coupling transmission. Particularly preferably the superposition transmission enables a complete circumvention of the coupling transmission so that when the operative connection between the output shaft and the first connecting shaft or the second connecting shaft is generated via the superposition transmission two operative connections can be present between the output shaft and the first connecting shaft or the second connecting shaft, i.e., one via the coupling transmission and another one via the superposition transmission.

With the superposition transmission it is in particular possible in a curve drive of the motor vehicle to transmit a torque from the first wheel axle for example the front wheel axle, to that subaxle of the second wheel axle that is assigned to an outbound wheel. This means that by means of the superposition transmission a torque vectoring is possible in many driving situations of the motor vehicle, preferably in every driving state of the motor vehicle, i.e., the targeted transmission of torque to a defined wheel axle, in particular to a defined subaxle of the second wheel axle. The superposition transmission can for example be realized as a minus planetary transmission or as a plus planetary transmission.

In a preferred embodiment of the invention it is provided that the coupling transmission has a first planetary transmission and a second planetary transmission directly operatively connected with the first planetary transmission, wherein the drive shaft and the output shaft are directly operatively connected with the first planetary transmission and the first and the second connecting shaft are directly operatively connected with the second planetary transmission. The first planetary transmission hereby represents a middle differential, while the second planetary transmission operates as an axle differential for the second wheel axle. The two planetary transmission are operatively connected with each other. The drive shaft and the output shaft are directly connected to the first planetary transmission, while the two connecting shafts are directly connected to the second planetary transmission. The term direct operative connection or direct connection means that the mentioned shafts are respectively coupled with an element of the corresponding planetary transmission so that the operative connection does not extend over other planetary transmissions. The operative connection between the first planetary transmission and the second planetary transmission is for example provided so that the ring gears of the planetary transmissions are directly operatively connected with each other or are configured as a common ring gear.

In a preferred embodiment of the invention the first planetary transmission has a first sun gear, a first ring gear and a first planet carrier with at least one planet gear which meshes with the first sun gear and the first ring gear, wherein the first planet carrier is operatively connected with the drive shaft and the first sun gear with the output shaft. The first planetary transmission has also the known construction with sun gear ring gear and planetary gear arranged on the planet carrier. The planet gear is rotatably arranged on the planet carrier and meshes with the first sun gear and also with the first ring gear, i.e., it insofar generates an operative connection between these. Connected to the first planet carrier is the drive shaft and connected to the first sun gear the output shaft.

In a preferred embodiment of the invention it is provided that the second planetary transmission has a second sun gear, a second ring gear and a second planet carrier, wherein the second planet carrier is operatively connected with the first or the second connecting shaft and the second sun gear is operatively connected with the respective other connecting shaft. Also the second planetary transmission thus has the sun gear, the ring gear and the planet carrier. Generally there are two different possible configurations for the transmission device. For example the first connecting shaft can be connected to the second planet carrier, while the second sun gear is connected to the second connecting shaft. Vice versa of course also the second connecting shaft can be operatively connected or connected with the second planet carrier and the first connecting shaft with the second sun gear.

An embodiment of the invention provides that the second planet carrier has at least one outer planet gear and at least one inner planet gear which mesh with each other, wherein the outer planet gear meshes with the second ring gear and the inner planet gear with the second sun gear. The second planetary transmission differs thus from the first planetary transmission insofar as it is configured as a dual planetary transmission. Correspondingly the outer planet gear as well as the inner planet gear is provided via which the second ring gear and the second sun gear are operatively connected with each other. The outer planet gear as well as the inner planet gear are rotatably arranged on the second planet carrier. They mesh with each other while simultaneously the outer planet gear engages in the second ring gear and the in the second sun gear. The outer planet gear and the inner planet gear an be arranged at different radial positions in relation to a rotation axis of the planet carrier.

An advantageous embodiment of the invention provides that the operative connection between the second connecting shaft and the second planet carrier is accomplished via a gear stage or the operative connection between the second connecting shaft and the second sun gear is accomplished via a further gear stage or via a rotation-direction maintaining coupling, in particular via a variable transmission or via a rotation-direction maintaining gear transmission. Also in this case two configurations are possible for the transmission device. The second connecting shaft can in particular either be connected to the second planet carrier or alternatively to the second sun gear. In the former case for example a gear stage is present, wherein for example a first gearwheel is provided in the second planet carrier or is operatively connected with the second planet carrier, while a further gearwheel which meshes with this gearwheel is present on the second connecting shaft.

On the other hand, when the second connecting shaft is to be operatively connected with the second sun gear, the second connecting shaft is present via the further gear stage or via the rotation-direction maintaining coupling. For the further gear stage the aforementioned description regarding the first gear stage applies. The rotation-direction maintaining coupling is a transmission device which at its input side has the same direction of rotation as at its output side. For example the coupling is configured as a variable transmission or as a gear transmission with an intermediate stage, i.e., as a rotation-direction maintaining gear transmission.

In a further particularly preferred embodiment of the invention it is provided that the superposition transmission is configured as a planetary transmission via which the drive shaft is operatively connected with the first ring gear and/or the second ring gear. The superposition transmission is hereby in particular directly and/or rigidly connected with the first ring gear on one side and/or the second ring gear on the other side. The operative connection is insofar not merely indirect for example via the coupling transmission. As explained above the superposition transmission can either be configured as a minus planetary transmission or as a plus planetary transmission which differ regarding the direction of rotation at least with regard to their components.

Hereby it can for example be provided in a further embodiment of the invention that the superposition transmission has a superposition transmission sun gear and a superposition transmission planet gear, wherein a first superposition transmission planet gear, which is supported on the superposition transmission planet carrier, meshes with the superposition transmission sun gear that is coupled with the output shaft, and a second superposition transmission planet gear, which is also supported on the superposition transmission planet carrier, meshes with a superposition transmission gear which is coupled with the first ring gear and/or the second ring gear. The superposition transmission sun gear is preferably rigidly and/or permanently operatively connected with the output shaft, in particular fastened on the output shaft. The superposition transmission sun gear can insofar also be referred to as output shaft gear. Correspondingly the superposition transmission gear can be rigidly and/or permanently operatively connected with the first ring gear and/or the second ring gear, in particular fastened on these.

For example in this case different transmission ratios are present between the superposition transmission planet gear and the superposition transmission sun gear on one hand and the superposition transmission planet gear and the superposition transmission gear on the other hand. Of course also identical transmission ratios can be realized. For example at least one of the transmission ratios is equal to one while the other one is different from one. Of course both transmission ratios can also be different from one, in particular greater than one or smaller than one. Also an embodiment in which both transmission rations are equal to one can be realized.

As an alternative it can of course also be provided that the superposition transmission has the superposition transmission planet carrier and a superposition transmission ring gear, wherein the former is rigidly and/or permanently operatively connected with the first ring gear and/or the second ring gear. The superposition transmission ring gear on the other hand can in such an embodiment be rigidly and/or permanently operatively connected with the output shaft, in particular fastened to the output shaft.

In a further embodiment of the invention the coupling transmission has at least one clutch by means of which the second planet carrier or the second sun gear can be fixed at least partially, in particular completely, relative to the first planet carrier or relative to the superposition transmission planet carrier. Preferably of course two clutches are provided, wherein by means of a first clutch the second planet carrier and by means of a second clutch the second sun gear can be fixed at least partially, in particular completely, relative to the first planet carrier or relative to the superposition transmission planet carrier. With such an embodiment of the coupling transmission a torque distribution between the first and the second wheel axle can be achieved. In particular the torque or a portion of the torque can be shifted in a targeted manner from the first wheel axle either to the first subaxle or the second subaxle of the second wheel axle.

Correspondingly a torque vectoring by means of a single transmission device can be realized. When, as described above, two clutches are provided a torque can be shifted in a targeted manner from the first wheel axle to the first subaxle, the second subaxle or both by actuating the respective clutch. When the clutch is controlled so that the fixing is only partial, a slip is established between the second planet carrier or the second sun gear and the first planet carrier. On the other hand when a complete fixing is provided a slip-free connection is generated.

In a preferred embodiment of the invention the first ring gear and the second ring gear are configured as a common ring gear of the second planetary transmission. In this way the operative connection between the first planetary transmission and the second planetary transmission can be accomplished in a simple manner via the ring gears.

An embodiment of the invention provides that via a first transmission unit the first connecting shaft can be connected with the first subaxle and via a second transmission unit, which in particular is identical to the first transmission unit, the second connecting shaft can be connected with the second subaxle. The transmission units are thus provided between the connecting shafts and the respective subaxle. These transmission units can for example have a gear stage, in particular a bevel gear stage. Hereby different transmission units can be provided for the first subaxle and the second subaxle. However it is particularly advantageous when the second transmission unit of the second subaxle is identical with the first transmission unit of the first subaxle, which requires fewer different parts that have to be kept in reserve.

It can also be provided that the first and the second connecting shaft are arranged coaxial to each other or with a parallel offset to each other. The former is in particular the case when the first connecting shaft is directly operatively connected with the second planet carrier and the second connecting shaft with the second sun gear, i.e., for example without the aforementioned gear stage. The coaxial arrangement of the two connecting shafts enables a very space-efficient configuration of the transmission device. The parallel arrangement is in particular provided when for example the operative connection of the first connecting shaft extends via the gear stage or the rotation-direction maintaining coupling.

BRIEF DESCRIPTION OF THE DRAWING

In the following the invention is explained in more detail by way of the exemplary embodiments shown in the drawing without limiting the invention. Hereby it is shown in.

DETAILED DESCRIPTION OF PREFERRED EMBODIMENTS

Figure 1:
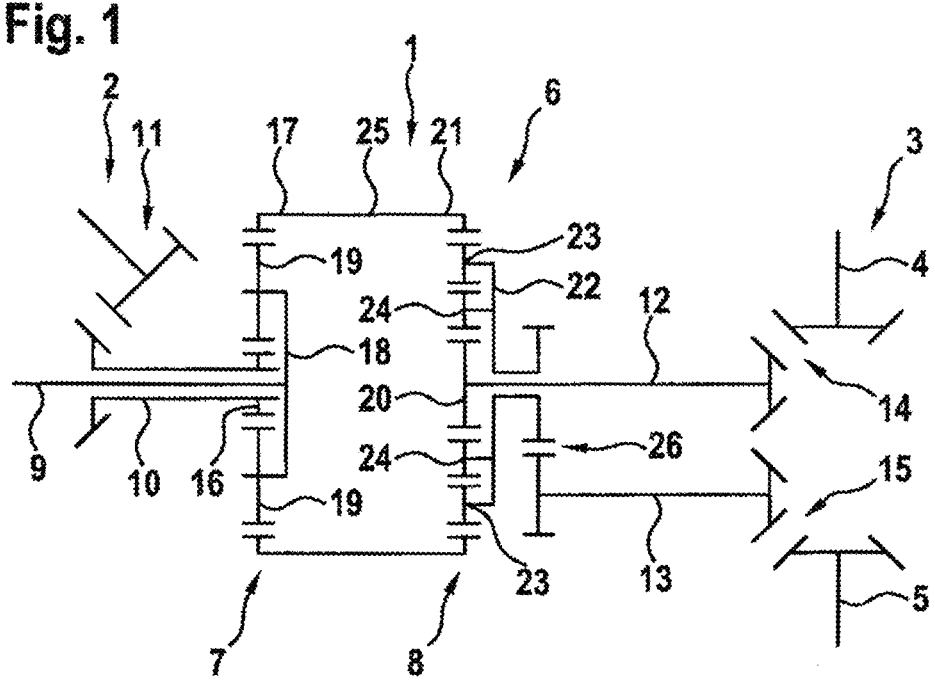
FIG. 1 a first embodiment of the transmission device.

FIG. 1 shows a first embodiment of a transmission device 1 for a not further illustrated motor vehicle. The motor vehicle has a first wheel axle 2 and a second wheel axle 3 which is here only schematically indicated, wherein the second wheel axle 3 consists of at least one first subaxle 4 and a second subaxle 5. The transmission device 1, the first wheel axle 2 and the second wheel axle 3 form at least a part of a drive train of the motor vehicle. The transmission device 1 has a coupling transmission 6, which is formed essentially by a first planetary transmission 7 and a second planetary transmission 8. The coupling transmission 1 has a drive shaft 9, which can be operatively connected with a drive aggregate of the motor vehicle. The coupling transmission 6 also has an output shaft 10 to which via a gear stage 11 the first wheel axle 2 is connected. An operative connection of the coupling transmission 6 to the second wheel axle 3 or the first subaxle 4 assigned to the first wheel axle and the second subaxle 5 is accomplished via a first connecting shaft 12 and a second connecting shaft 13. The first connecting shaft 12 is operatively connected with the first subaxle 4 via a transmission unit 14, which is for example constructed as a gear stage, and the second connecting shaft is operatively connected with the second subaxle 5 via a second transmission unit 15, which is for example also constructed as a gear stage.

The first planetary transmission 7 includes a first sun gear 16, a first ring gear 17 and a first planet carrier 18 with at least one planet gear 19. The second planetary transmission 8 on the other hand includes a second sun gear 20, a second ring gear 21 and a second planet carrier 22. On the second planet carrier 22 at least one outer planet gear 23 and at least one inner planet gear 24 are rotatably arranged. The planet gear 1,9 which is rotatably fastened on the first planet carrier 18, meshes with the first sun gear 16 as well as the first ring gear 17. Regarding the second planetary transmission 8 on the other hand it is provided that the outer planet gear 23 meshes with the inner planet gear 24 and with the second ring gear 21. The inner planet gear 24 on the other hand meshes with the outer planet gear 23 and with the second sun gear 20. An operative connection between the second sun gear 20 and the second ring gear 21 is thus established via the outer planet gear 23 and the inner planet gear 24.

The planetary transmissions 7 and 8 are operatively connected with each other. In the present exemplary embodiment this is realized by configuring the ring gears 17 and 21 as a common ring gear 25. However, an operative connection between the ring gears 17 and 21 can also be established in a different manner. The drive shaft 9 and the output shaft 10 are directly operatively connected with the first planetary transmission 7 and the two connecting shafts 12 and 13 are directly operatively connected with the second planetary transmission 8. Hereby in the present exemplary embodiment the drive shaft 9 is directly operatively connected with the first planet carrier 18 and the output shaft 10 with the first sun gear 16. On the other hand the first connecting shaft 12 is directly operatively connected with the second sun gear 20 and the second connecting shaft 13 via gear stage 26 with the second planet carrier 22.

Figure 2:
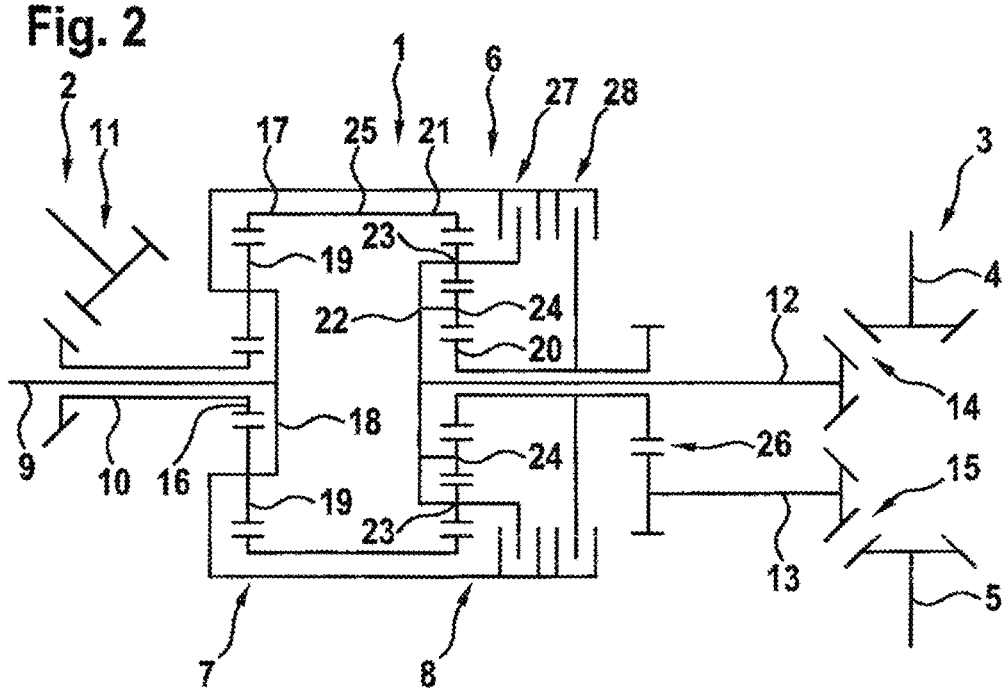
FIG. 2 a first variant of a second embodiment of the transmission device.

FIG. 2 shows a first variant of a second embodiment of the transmission device 1. This variant is generally similar to the first embodiment so that insofar reference is made to the description above. In the following only the differences are discussed. These differences are mainly found in the second planetary transmission 8. The first connecting shaft 12 is directly connected to the second planet carrier 22 while the second connecting shaft 13 is connected to the second sun gear 20 via the gear stage 26.

This arrangement offers the possibility to provide two clutches. By means of the clutch 27 the second planet carrier 22 can be fixed at least partially, in particular completely, relative to the first planet carrier 19. By means of the clutch 28 on the other hand the second sun gear 20 can be fixed at least partially, in particular completely, relative to the planet carrier 18. By means of the clutches 27 and 28 a torque can be redirected in a targeted manner form the first wheel axle 2 to either the first subaxle 4 (by means of the clutch 27) or to the second subaxle 5 (by means of the clutch 28). Correspondingly the transmission device 1 realizes a torque vectoring between the first wheel axle 2 and the second wheel axle 3 or the subaxles 4 and 5. Via the clutches 27 and 28 also an operative connection to the sun gear 16 can be generated instead of the operative connection to the first planet carrier 18.

In the here shown first variant of the first embodiment of the transmission device 1 the transmission units 14 and 15 are configured mirror symmetrical. This is also the case for the first embodiment, which is shown in FIG. 1.

Figure 3:
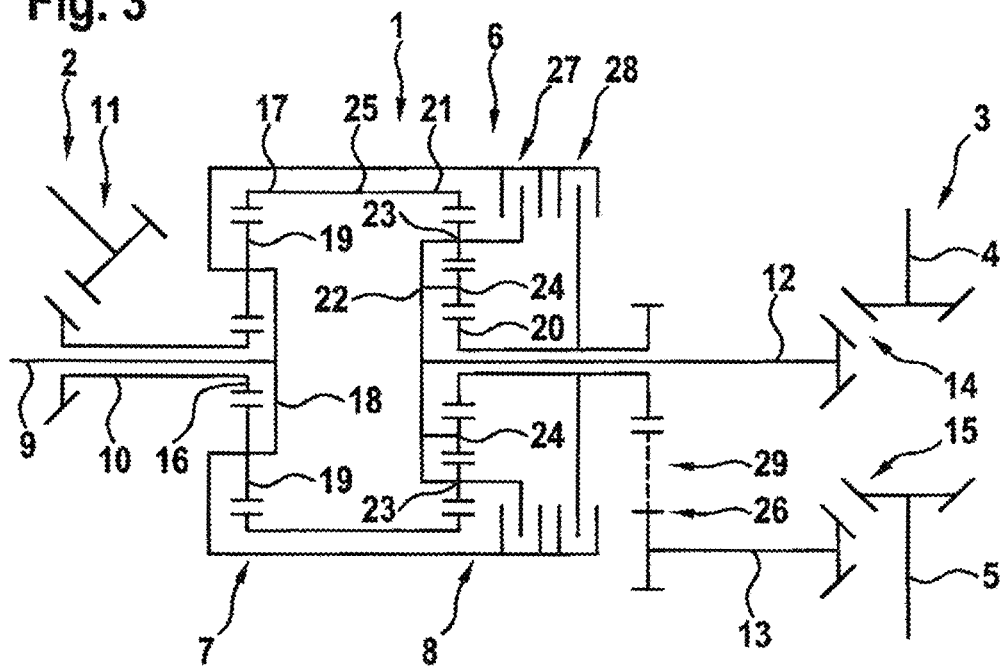
FIG. 3 a second variant of the second embodiment.

FIG. 3 shows a second variant of the second embodiment. In the following only the differences are discussed. Insofar reference is made to the description above. In this case the transmission units 14 and 15 are configured identical. This has the advantage that the number of different parts that have to be provided can be reduced. In such a configuration of the transmission units 14 and 15 the connection for example of the second connecting shaft 13 to the second planetary transmission 6 has to be changed. For example in this case only one rotation-direction maintaining clutch 29 is provided, which in the present case is configured as a variable transmission.

Figure 4:
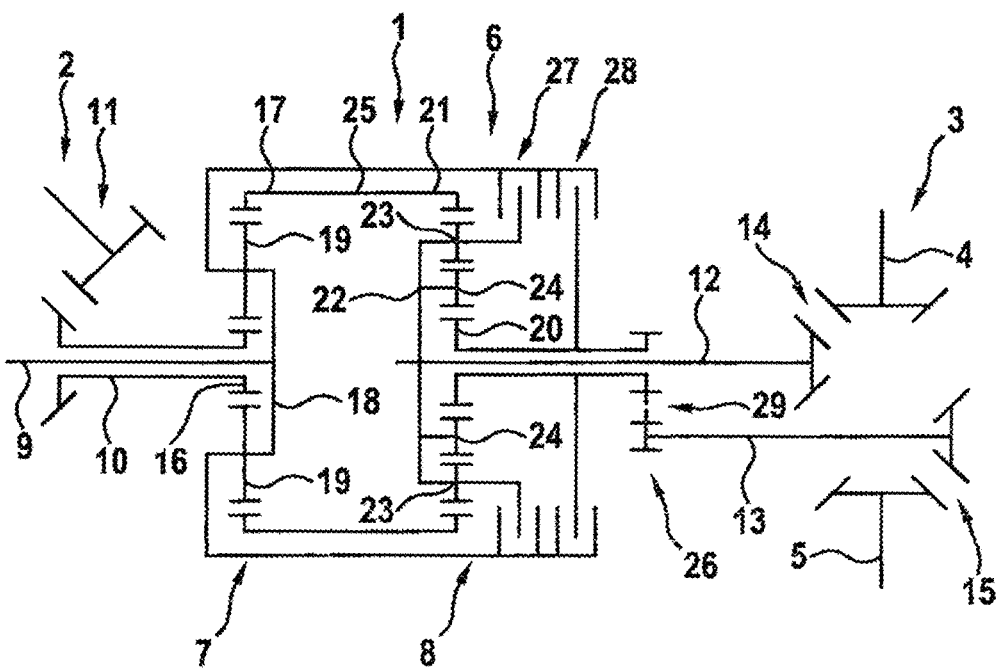
FIG. 4 a third variant of the second embodiment.

FIG. 4 shows a third variant of the second embodiment of the transmission device 1. Also in this case reference is made to the description above. The difference to the variants above is found in the arrangement of the transmission units 14 and 15 relative to each other. Due to the here selected design these can be arranged relative to each other in a very space-saving manner or can even be integrated in a transmission module.

Figure 5:
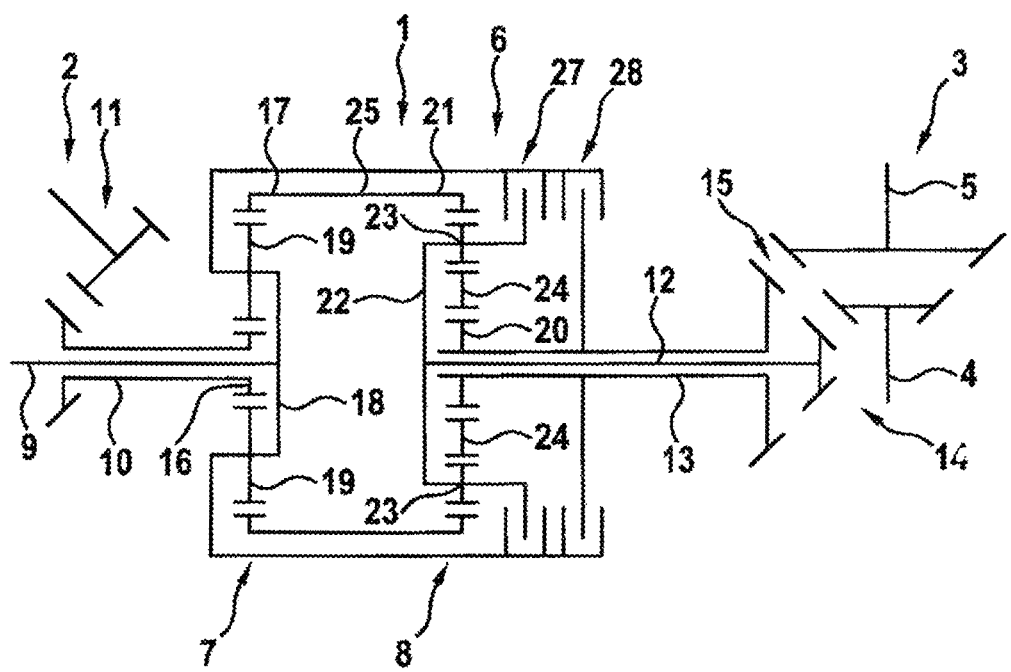
FIG. 5 a fourth variant of the second embodiment.

FIG. 5 shows a fourth variant of the second embodiment oft the transmission device 1. Again reference is made to the description above. While the connecting shafts 12 and 13 in the embodiments described so far were arranged parallel to each other, they are now arranged coaxial to each other. In this way a very space-saving arrangement of the transmission units 14 and 15 or an integration in a transmission module is possible.

Figure 6:
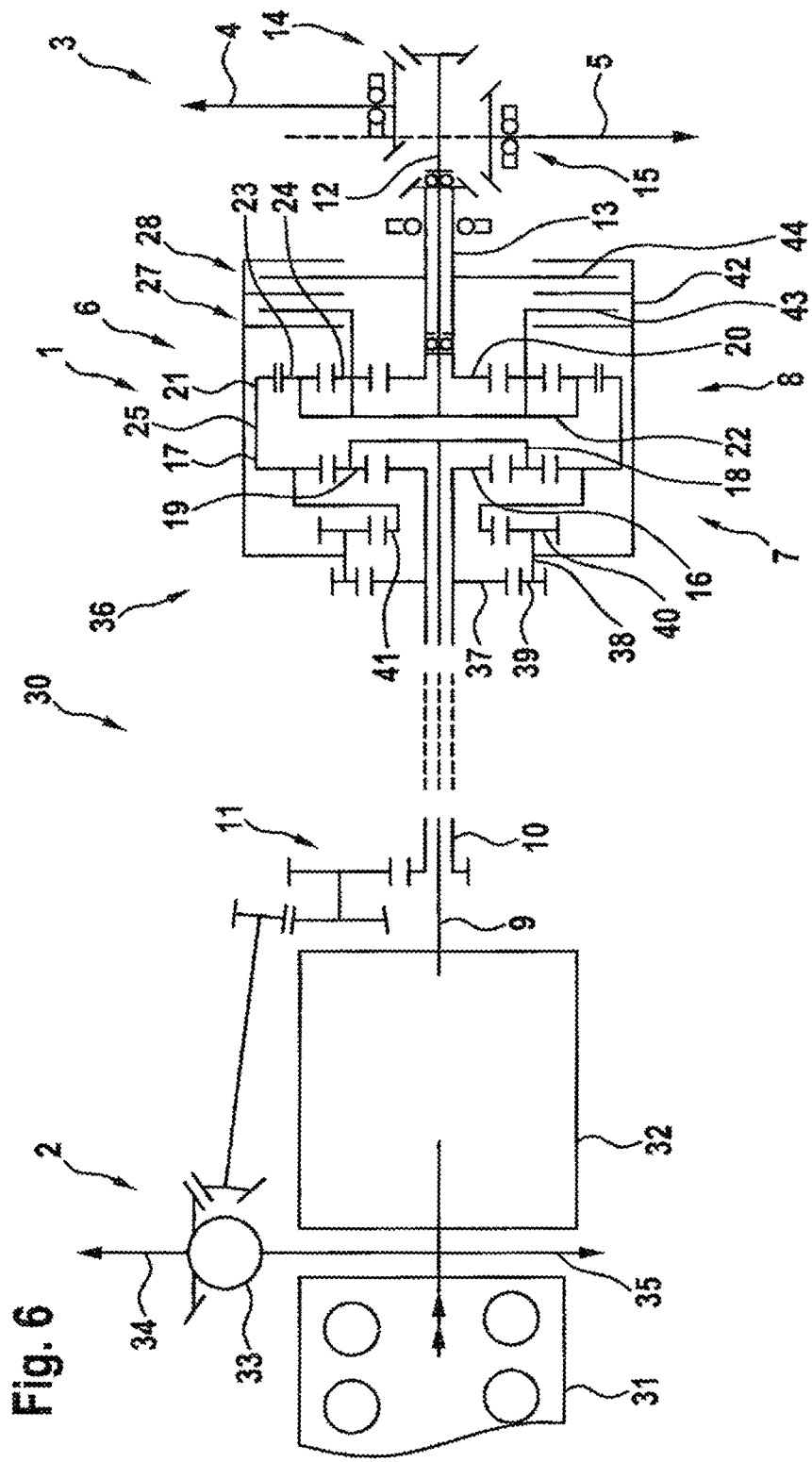
FIG. 6 a schematic representation of a drive train with the transmission device in a first variant of a third embodiment, FIG. 7 a detail view of the transmission device in the first variant of the third embodiment, FIG. 8 the transmission device in a second variant of the third embodiment, and FIG. 9 the transmission device in a third variant of the third embodiment.

FIG. 6 shows a schematic representation of a drive train 30 of the motor vehicle. The drive train has a drive aggregate 31 for example an internal combustion engine and a transmission 32, in particular a manual transmission. The drive aggregate 31 is operatively connected with the transmission device 1, in particular via the transmission 32. The operative connection of the drive aggregate 31 is hereby established to the drive shaft 9 of the transmission device 1. Also in the here shown variant of a third embodiment the transmission device 1 has the coupling transmission 6, which is formed essentially by the first planetary transmission 7 and the second planetary transmission 8. The output shaft 10 of the coupling transmission 6 is connected to the first wheel axle 2, for example via the gear stage 11. The first wheel axle 2 can have an axle differential 33 via which subaxles 34 and 35 of the first wheel axle 2 are operatively connected with the gear stage 11 or the output shaft 10. The wheel axle 3, or the subaxles 4 and 5 assigned to this wheel axle, are operatively connected with the coupling transmission 6 via the first connecting shaft 12 and the second connecting shaft 13. The first connecting shaft 12 is operatively connected with the first subaxle 4 via the first transmission unit 14, which is for example constructed as a gear stage, and the second connecting shaft 13 with the second subaxle 5 via a second transmission unit 15, which is for example also constructed as a gear stage.

The first planetary transmission 7 is formed by the first sun gear 16, the second ring gear 17 and the first planet carrier 18 with at least one planet gear 19. The second planetary transmission 8 is formed by the second sun gear 20, the second ring gear 21 and the second planet carrier 22. On the second planet carrier 22 the at least one outer planet gear 23 and the at least one inner planet gear 24 are rotatably arranged. The planet gear 19, which is rotatably arranged on the first planet carrier 18, meshes with the first sun gear 16 as well as with the first ring gear 17. In the case of the second planetary transmission 8 the outer planet gear 23 meshes with the inner planet gear 24 and also with the second ring gear 21. The inner planet gear 24 meshes with the outer planet gear 23 and the second sun gear 20. The operative connection between the second sun gear 20 and the second ring gear 21 is thus accomplished via the outer planet gear 23 and the inner planet gear 24. The above description can generally be used for understanding the transmission device 1.

The planetary transmissions 7 and 8 are operatively connected with each other by virtue of the fact that the ring gears 17 and 21 are configured as a common ring gear 25. Of course the operative connection between the ring gears 17 and 21 can also be accomplished in a different manner. The drive shaft 9 and the output shaft 10 are directly operatively connected with the first planetary transmission 7 and the two connecting shafts 12 and 13 are directly operatively connected with the second planetary transmission 8. The operative connections are hereby preferably rigid and/or permanent. In the shown exemplary embodiment the drive shaft 9 is hereby directly operatively connected with the planet carrier 18 and the output shaft 10 with the first sun gear 16. The first connecting shaft 12 is directly operatively connected with the second planet carrier 22 and the second connecting shaft 13 with the second sun gear 20.

Beside the coupling transmission 6 the transmission device 1 has a superposition transmission 36. This serves for the switchable operative connection of the output shaft 10 with the first connecting shaft 12 and/or the second connecting shaft 13. The superposition transmission 36 is configured as a planetary transmission, which has a superposition transmission planet carrier 38. On the superposition transmission planet carrier at least a first superposition transmission planet gear 39 and a second superposition transmission planet gear 40 are rotatably supported. The first superposition transmission planet gear 39 meshes with the superposition transmission sun gear 37 which is coupled with or rigidly fastened on the output shaft 10.

The second superposition transmission planet gear 40 on the other hand meshes with a superposition transmission gear 41, which is here configured as a superposition transmission sun gear 41. The superposition transmission gear 41 is operatively connected with the first ring gear 17 and/or the second ring gear 21, in particular the common ring gear 25, in particular rigidly and/or permanently. Preferably the superposition transmission gear 41 is fastened on the common ring gear 25. Between the superposition transmission sun gear 37 and the first superposition transmission planet gear 39 a first transmission ratio of the superposition transmission is present. These transmission ratios are preferably different from each other so that in particular the superposition transmission planet gears 39 and 40 have different diameters. In the here shown exemplary embodiment the first transmission ratio of the superposition transmission is greater than the second transmission ratio of the superposition transmission.

The superposition transmission planet carrier 38 is rigidly and/or permanently operatively connected with a first coupling element 42, which is commonly assigned to the clutches 27 and 28. The clutch 27 has a second coupling element 43 and the clutch 28 a second coupling element 44. The second coupling element 43 and also the second coupling element 44 can be selectively coupled with the first coupling element 42 for torque distribution. In a first switching state of the clutches 27 and 28 the second coupling elements 43 and 44 are thus completely separated from the first coupling element 42 so that no torque is transmitted. In a second operating mode of the clutch 27 on the other hand the second coupling element 43 is connected with the first coupling element 42 and in a second operating mode of the clutch 28 the second coupling element 44 is connected with the first coupling element 42 for torque distribution. Correspondingly via the clutches 27 and 28 an operative connection between the superposition transmission planet carrier 38 and the first connecting shat 12 the second connecting shaft 13 or both can be selectively generated.

Figure 7:
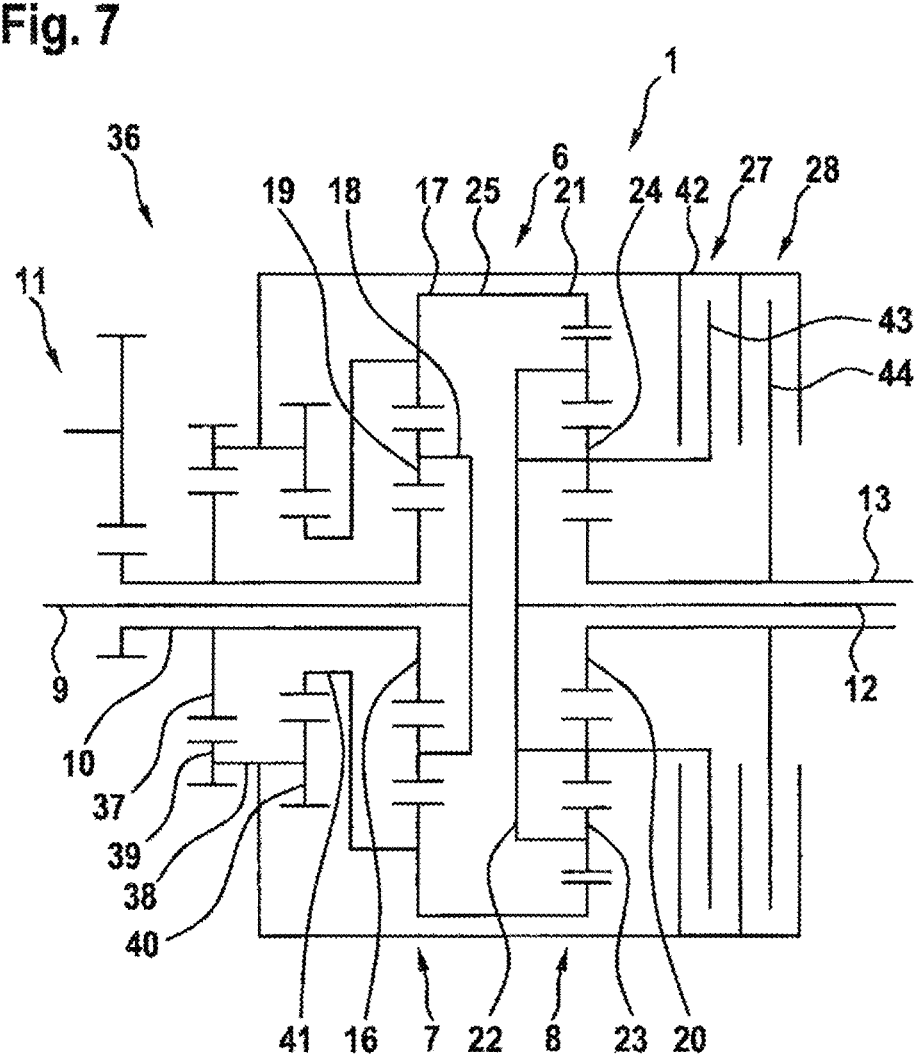

FIG. 7 shows a detail view of the first variant of the third embodiment of the transmission device 1 shown in FIG. 6. Insofar reference is made to the description above.

Figure 8:
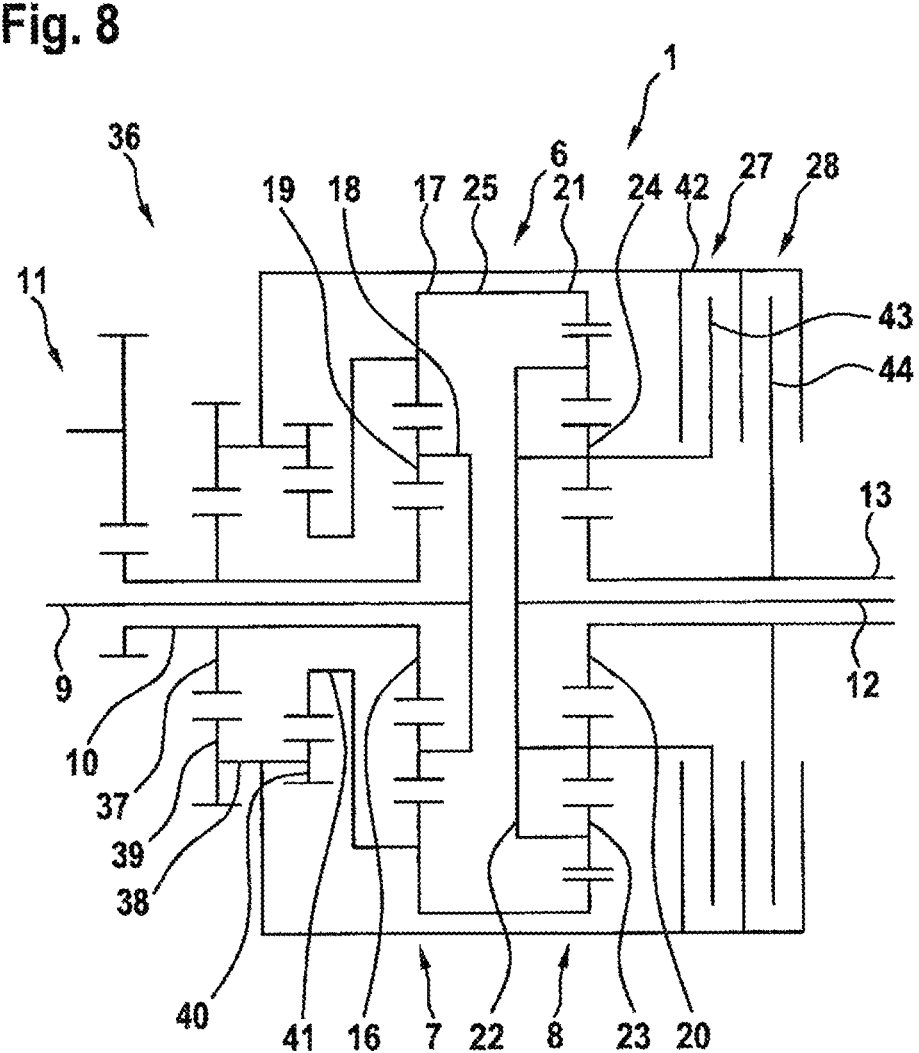

FIG. 8 shows a second variant of the third embodiment of the transmission device 1. The only difference to the first variant is that the transmission ratios of the superposition transmission are different. In the shown variant the first transmission ratio of the superposition transmission is smaller than the second transmission ratio of the superposition transmission. Regarding the further configuration of the transmission device 1 reference is made to the description above.

Figure 9:
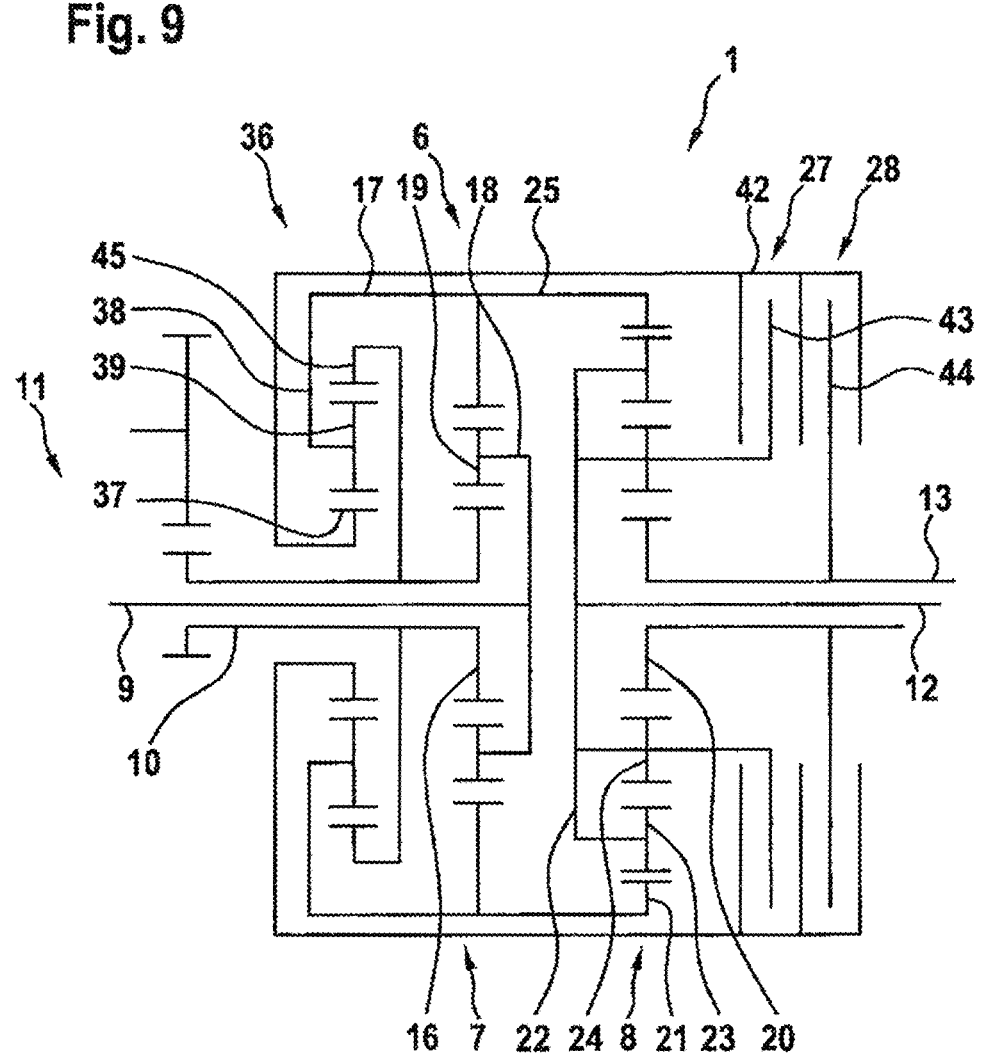

FIG. 9 shows a third variant of the third embodiment of the transmission device 1. Again reference is made to the description above regarding the first and second variant of the third embodiment. The difference to the first and second variants is a different configuration of the superposition transmission 36, which in this case is configured as a minus planetary transmission, while before a plus planetary transmission was described. The superposition transmission 36 has the superposition transmission sun gear 37, the superposition transmission planet carrier 38 with the at least one superposition transmission planet gear 39 and a superposition transmission ring gear 45.

The superposition transmission ring gear 45 is rigidly and/or permanently operatively connected with the output shaft 10. The superposition transmission planet carrier 38 on the other hand is rigidly and/or permanently operatively connected with the first ring gear 17, the second ring gear 21 or the common ring gear 25. The first coupling element 42 is operatively rigidly and/or permanently coupled with or fastened to the superposition transmission sun gear 37. Also in this third variant the advantages of the further variants or the further embodiments can be realized. However, the third variant requires a large construction space.

What is claimed is:

1. A transmission device for a motor vehicle having a first wheel axle and a second wheel axle, said second wheel axle comprising a first subaxle and a second subaxle, said transmission device comprising:

a first connecting shaft operatively connectable to the first subaxle of the second wheel axle of the motor vehicle via a first transmission unit;

a second connecting shaft extending parallel to the first connecting shaft and operatively connectable to the second subaxle of the second wheel axle of the motor vehicle via a second transmission unit;

a coupling transmission having a drive shaft operatively connectable with a drive aggregate of the motor vehicle, and an output shaft extending parallel to the drive shaft and around the drive shaft and operatively connectable with the first wheel axle, wherein via the coupling transmission the drive shaft is operatively connected with the output shaft and with the first and the second connecting shaft for torque distribution; and a superposition transmission, said output shaft being operatively connectable with at least one of the first connecting shaft and the second connecting shaft via the superposition transmission by shifting the superposition transmission, wherein the coupling transmission comprises a first planetary transmission and a second planetary transmission directly operatively connected with the first planetary transmission, wherein the drive shaft and the output shaft are directly operatively connected with the first planetary transmission and the first and the second connecting shafts are directly operatively connected with the second planetary transmission.

2. The transmission device of claim 1, wherein the first planetary transmission includes a first sun gear, a first ring gear and a first planet carrier with at least one planet gear that meshes with the first sun gear and the first ring gear, said first planet carrier being operatively connected with the drive shaft and the first sun gear with the output shaft.

3. The transmission device of claim 2, wherein the second planetary transmission includes a second sun gear a second ring gear and a second planet carrier, wherein the second planet carrier is operatively connected with the first or the second connecting shaft and the second sun gear is operatively connected with the other connecting shaft.

4. The transmission device of claim 3, wherein the second planet carrier has at least one outer planet gear and at least one inner planet gear which mesh with each other, and wherein the outer planet gear meshes with the second ring gear and the inner planet gear meshes with the second sun gear.

5. The transmission device of claim 3, wherein the operative connection between the second connecting shaft and the second planet carrier is accomplished via a gear stage.

6. The transmission device of claim 3, wherein the operative connection between the second connecting shaft and the second sun gear is accomplished via a gear stage or via a rotation-direction maintaining coupling.

7. The transmission device of claim 6, wherein the rotation-direction maintaining coupling is a variable transmission or a rotation-direction maintaining gear stage.

8. The transmission device of claim 2, wherein the superposition transmission is configured as a planetary transmission via which the output shaft is operatively connected with at least one of the first ring gear and the second ring gear.

9. The transmission device of claim 3, wherein the superposition transmission includes a superposition transmission sun gear and a superposition transmission planet carrier, wherein a first superposition transmission planet gear supported on the superposition transmission planet carrier meshes with the superposition transmission sun gear that is coupled with the output shaft and a second superposition transmission planet gear supported on the superposition transmission planet carrier meshes with a superposition transmission gear which is coupled with at least one of the first ring gear and the second ring gear.

10. The transmission device of claim 9, further comprising at least one clutch adapted for fixing the second planet carrier or the second sun gear relative to the first planet carrier or relative to the superposition transmission planet carrier in a manner selected from the group consisting of partially fixing and completely fixing.

11. The transmission device of claim 1, wherein the second transmission unit is constructed identical to the first transmission unit.

12. The transmission device of claim 1, wherein the second connecting shaft extends in coaxial relation to the first connecting shaft.

* * * * *